US008879424B2

(12) United States Patent
Allan et al.

(10) Patent No.: US 8,879,424 B2
(45) Date of Patent: *Nov. 4, 2014

(54) METHOD AND APPARATUS FOR EXCHANGING ROUTING INFORMATION AND THE ESTABLISHMENT OF CONNECTIVITY ACROSS MULTIPLE NETWORK AREAS

(75) Inventors: David Allan, Ottawa (CA); Nigel Bragg, Weston Colville (GB); Paul Unbehagen, Apex, NC (US); Peter Ashwood-Smith, Hull (CA); Guoli Yin, Nepean (CA)

(73) Assignee: Constellation Technologies LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,907

(22) Filed: Jun. 19, 2012

(65) Prior Publication Data
US 2012/0263075 A1 Oct. 18, 2012

Related U.S. Application Data

(63) Continuation of application No. 11/899,118, filed on Sep. 4, 2007, now Pat. No. 8,223,668.

(60) Provisional application No. 60/874,806, filed on Dec. 14, 2006, provisional application No. 60/874,890, filed on Dec. 14, 2006.

(51) Int. Cl.
*H04L 12/66* (2006.01)
*H04L 12/28* (2006.01)
*G06F 15/16* (2006.01)
*H04L 12/751* (2013.01)
*H04L 12/721* (2013.01)
*H04L 12/46* (2006.01)
*H04L 12/715* (2013.01)

(52) U.S. Cl.
CPC ............ *H04L 12/462* (2013.01); *H04L 45/02* (2013.01); *H04L 45/66* (2013.01); *H04L 45/04* (2013.01)
USPC ............ 370/254; 370/401; 709/218; 709/249

(58) Field of Classification Search
None
See application file for complete search history.

(56) References Cited

U.S. PATENT DOCUMENTS 5,850,397 A * 12/1998 Raab et al. .................... 370/392
7,366,111 B2 * 4/2008 Thubert et al. ............... 370/254
(Continued)

OTHER PUBLICATIONS

Wollman et al., "Overview of Open Shortest Path First, Version 2 (OSPF V2) Routing in the Tactical Environment", IEEE 1995.

*Primary Examiner* — Gregory Sefcheck
(74) *Attorney, Agent, or Firm* — Anderson Gorecki & Rouille LLP

(57) ABSTRACT

Routes may be installed across multiple link state protocol controlled Ethernet network areas by causing ABBs to leak I-SID information advertised by BEBs in a L1 network area into an L2 network area. ABBs will only leak I-SIDs for BEBs where it is the closest ABB for that BEB. Where another ABB on the L2 network also leaks the same I-SID into the L2 network area from another L1 network area, the I-SID is of multi-area interest. ABBs will advertise I-SIDs that are common to the L1 and L2 networks back into their respective L1 network. Within each L1 and L2 network area, forwarding state will be installed between network elements advertising common interest in an ISID, so that multi-area paths may be created to span the L1/L2/L1 network areas. The L1/L2/L1 network structure may recurse an arbitrary number of times.

20 Claims, 4 Drawing Sheets

(56) References Cited

U.S. PATENT DOCUMENTS

| | | | |
|---|---|---|---|
| 7,756,958 B2* | 7/2010 | Nagarajrao et al. | 709/223 |
| 8,018,873 B1* | 9/2011 | Kompella | 370/254 |
| 8,223,668 B2* | 7/2012 | Allan et al. | 370/254 |
| 2005/0160179 A1* | 7/2005 | Retana et al. | 709/238 |
| 2005/0259589 A1* | 11/2005 | Rozmovits et al. | 370/249 |
| 2006/0227723 A1* | 10/2006 | Vasseur et al. | 370/254 |
| 2006/0227724 A1* | 10/2006 | Thubert et al. | 370/254 |
| 2007/0115857 A1* | 5/2007 | Webster | 370/254 |
| 2008/0056157 A1* | 3/2008 | Retana et al. | 370/254 |
| 2008/0101385 A1* | 5/2008 | Elias et al. | 370/401 |
| 2010/0238813 A1* | 9/2010 | Allan et al. | 370/252 |

* cited by examiner

Legend
a, b, c, d, e, f = Area Boundary Bridge
A, B, C, D, E, F = Backbone Edge Bridge
L1 = Level one network in hierarchy
L2 = Level two network in hierarchy

METHOD AND APPARATUS FOR EXCHANGING ROUTING INFORMATION AND THE ESTABLISHMENT OF CONNECTIVITY ACROSS MULTIPLE NETWORK AREAS

CROSS REFERENCE TO RELATED APPLICATIONS

This application is a continuation of U.S. patent application Ser. No. 11/899,118, filed Sep. 4, 2007, now U.S. Pat. No. 8,223,668, which claims the benefit of U.S. Provisional Patent Application No. 60/874,806, filed Dec. 14, 2006, entitled "Hierarchical Routing for PLSB," and U.S. Provisional Patent Application No. 60/874,890, filed Dec. 14, 2006, entitled "Recursive Provider Link State Bridging", the content of each of which is hereby incorporated herein by reference.

TECHNICAL FIELD

The present invention relates to Ethernet networks and, more particularly, to a method and apparatus for exchanging routing information and the establishment of connectivity across multiple network areas.

BACKGROUND

In Ethernet network architectures, devices connected to the network compete for the ability to use shared telecommunications paths at any given time. Where multiple bridges or nodes are used to interconnect network segments, multiple potential paths to the same destination often exist. The benefit of this architecture is that it provides path redundancy between bridges and permits capacity to be added to the network in the form of additional links. However to prevent loops from being formed, a spanning tree was generally used to restrict the manner in which traffic was broadcast on the network. Since routes were learned by broadcasting a frame and waiting for a response, and since both the request and response would follow the spanning tree, most if not all of the traffic would follow the links that were part of the spanning tree. This often led to over-utilization of the links that were on the spanning tree and non-utilization of the links that weren't part of the spanning tree.

To overcome some of the limitations inherent in Ethernet networks, a link state protocol controlled Ethernet network was disclosed in U.S. patent application Ser. No. 11/537,775, filed Oct. 2, 2006, entitled "Provider Link State Bridging," the content of which is hereby incorporated herein by reference. As described in greater detail in that application, the nodes in a link state protocol controlled Ethernet network exchange hello messages to learn adjacencies of other nodes on the network, and transmit link state advertisements to enable each node on the network to build a link state database. The link state database may then be used to compute shortest paths through the network. Each node then populates a Forwarding Information Base (FIB) which will be used by the node to make forwarding decisions so that frames will be forwarded over the computed shortest path to the destination. Since the shortest path to a particular destination is always used, the network traffic will be distributed across a larger number of links and follow a more optimal path for a larger number of nodes than where a single Spanning Tree or even multiple spanning trees are used to carry traffic on the network.

When customer traffic enters a provider network, the customer MAC address (C-MAC DA) is resolved to a provider MAC address (B-MAC DA), so that the provider may forward traffic on the provider network using the provider MAC address space. Additionally, the network elements on the provider network are configured to forward traffic based on Virtual LAN ID (VID) so that different frames addressed to the same destination address but having different VIDs may be forwarded over different paths through the network. In operation, a link state protocol controlled Ethernet network may associate one VID range with shortest path forwarding, such that unicast and multicast traffic may be forwarded using a VID from that range, and traffic engineering paths may be created across the network on paths other than the shortest path, and forwarded using a second VID range. The use of Traffic Engineered (TE) paths through a link state protocol controlled Ethernet network is described in greater detail in U.S. patent application Ser. No. 11/732,381, filed Apr. 3, 2007, entitled "Engineered Paths In A Link State Protocol Controlled Ethernet Network", the content of which is hereby incorporated herein by reference.

Large networks may be broken into smaller areas. Routing within a given area may be implemented independent of the other areas to enable the routing tables on the network elements within that area to be kept to a reasonable size and as a consequence the time to compute forwarding tables bounded as the network grows. Recognizing that some routes may need to span across multiple areas, however it may be desirable to provide a way that will enable the control planes of the multiple areas to coordinate the exchange of information to enable forwarding paths to be established across multiple network areas.

SUMMARY OF THE INVENTION

One aspect of Provider Link State Bridging that facilitates multiple area operation is that community of interest information in the form of the I-SID is incorporated into the routing system. This allows bridges on the boundaries between areas, called Area boundary bridges (ABBs), to be able to determine which community of interests are local to the area, and which span multiple areas. This provides the ABBs and Backbone Core Bridges (BCBs) with sufficient information to determine which services, and therefore associated Backbone Edge Bridges (BEBs), actually require multi-area connectivity and which do not, and only instantiate forwarding state for those that do.

An aspect of the IS-IS protocol (which is a preferred embodiment) that facilitates multi area operation is that the area structure is hierarchical, which simplifies the task of providing loop free symmetrical connectivity between BEBs in different areas. IS-IS uses a two level hierarchy L1 and L2 where L1 can be considered to be the network edge, and L2 the backbone. In IS-IS, the formal interface between an L1 and L2 is defined as being on a connection, not within a node. In this document an ABB is defined as a bridge operating both L1 and L2 routing instances. Optionally, according to an embodiment of the invention, the L2 network may be further formed as a second layer L1/L2/L1 network so that the multi-area network structure may recurse such that the L2 network layer of a lower layer (Layer X) is formed as a L1/L2/L1 set of network layers referred to as a higher layer (Layer X+1) network. Recursion of this nature may occur multiple time to enable a hierarchical network structure to be developed.

Routes may be installed across multiple link state protocol controlled Ethernet network areas by causing Area Boundary Bridges (ABBs), to determine which Backbone Edge Bridges (BEBs) it is closest to, and self select to represent those closest BEBs into the other adjacent area. That the network self elects P2P connectivity out of a given area simplifies the task of providing overall bi-directional symmetry. Since there is only one path out of an area for a given BEB, there will only be one path across the root or L2 area to perform inter-area interconnect of any two BEBs.

Each ABB will leak community of interest identifiers, such as I-SID information, received within an L1 network from the BEBs that it represents into an adjacent L2 network. The ABB will also listen on the L2 network for community of interest identifiers from other ABBs on the L2 network. When two or more ABBs advertise the same community of interest identifier in the L2 network, the route is of multi-area interest. Each ABB will then advertise the matching community of interest identifier into its respective L1 network to cause a path within the L1 network to be established between the BEB and ABB in the L1 network. Similarly, a path will be established in the L2 network between ABBs that have advertised common community of interest identifiers. Within the L1 network area, Backbone Core Bridges (BCBs) will install forwarding state if they are on a shortest path between a BEB and its closest ABB for those BEBs that host community of interest identifiers that are associated with multi-area routes. BCBs within the adjacent L2 network area will establish shortest path forwarding state between ABBs advertising common community of interest identifiers, to thereby establish the routes through the adjacent network area. ABBs may additionally summarize BEB rooted multicast trees such that the set of trees for a given community of interest identifiers transiting the ABB is condensed into a common tree rooted on the ABB. One example of a community of interest identifier that may be used in connection with an embodiment of the invention is the I-SID. Although this embodiment will be described in considerable detail, the invention is not limited to an implementation that utilizes the I-SID as the community of interest identifier as other embodiments may use another type of community of interest identifier.

Further as an enhancement to scalability, a network may be configured to include multiple link state protocol controlled Ethernet network areas. As a frame enters a first of these network areas it may be encapsulated using MAC-in-MAC encapsulation for transportation across the first network area. The frame may further be encapsulated with a new MAC header upon transition from the first to a second network area and learning used to establish the bindings between MAC addresses in the first area and MAC addresses in the second area. Advertisements in the routing system are used to construct multicast trees which are utilized to scope the flooding and learning to the community of interest associated with a given community of interest identifier such as I-SID. The MAC-in-MAC-in-MAC utilizes the MAC-in-MAC I-SIDs such that the outer MAC multicast address is selected according to an I-SID associated with the frame and is therefore scoped to the community of interest associated with the I-SID. By selecting the multicast MAC address for the second network area to coincide with the frame's I-SID, the frame may be encapsulated to follow a multi-area path through the second network area. I-SIDs may be leaked between network areas to enable the multi-area routes to be established, and the encapsulation process may then be used to enable frames to be formatted for transportation across the network areas. The process may recurs multiple times if necessary by further encapsulation as the frame is transmitted to higher levels of a network hierarchy or, more specifically, toward the center of the network. The process may be reversed as the frame is transmitted down the network hierarchy toward its destination after leaving the center of the network.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Using a link state protocol with 802.1ah to control the Ethernet backbone network enables the Ethernet network to be scaled from the LAN space to the MAN, and to the WAN, by providing more efficient use of network capacity with loop-free shortest path forwarding. Rather than utilizing a learned network view at each node by using the Spanning Tree Protocol (STP) algorithm combined with transparent bridging, in a link state protocol controlled Ethernet network the bridges forming the mesh network exchange link state advertisements to enable each node to have a synchronized view of the network topology. This is achieved via the well understood mechanism of a link state routing system. The bridges in the network have a synchronized view of the network topology, have knowledge of the requisite unicast and multicast connectivity, can compute a shortest path connectivity between any pair of bridges in the network, and individually can populate their forwarding information bases (FIBs) according to the computed view of the network.

When all nodes have computed their role in the synchronized view and populated their FIBs, the network will have a loop-free unicast tree to any given bridge from the set of peer bridges (those that require communication to that bridge for whatever reason); and a both congruent and loop-free point-to-multipoint (p2mp) multicast tree from any given bridge to the same set or subset of peer bridges per service instance hosted at the bridge. The result is the path between a given bridge pair is not constrained to transiting the root bridge of a spanning tree and the overall result can better utilize the breadth of connectivity of a mesh. In essence every bridge roots one or more spanning trees which define unicast connectivity to that bridge, and multicast connectivity from that bridge.

Link state protocol controlled Ethernet networks provide the equivalent of Ethernet bridged connectivity, but achieve this via configuration of the network element FIBs rather than by flooding and learning. As such it can be used by emerging standards such as IEEE (Institute of Electrical and Electronics Engineers) 802.1ah draft standard entitled Provider Backbone Bridging or MAC-in-MAC with configured forwarding of B-MACs (Backbone MAC) and trivial modifications to the BEB adaptation function, to map client broadcast behavior to multicast, such that client Ethernets can utilize the connectivity offered by the link state protocol controlled Ethernet network without modification. MAC configuration may be used to construct shortest path loop-free connectivity (for both unicast and multicast purposes) between a set of (slightly modified) 802.1ah provider backbone bridges in order to provide transparent LAN service to the C-MAC (Customer MAC) layer or other layer networks that can use a transparent LAN service.

Figure 1:
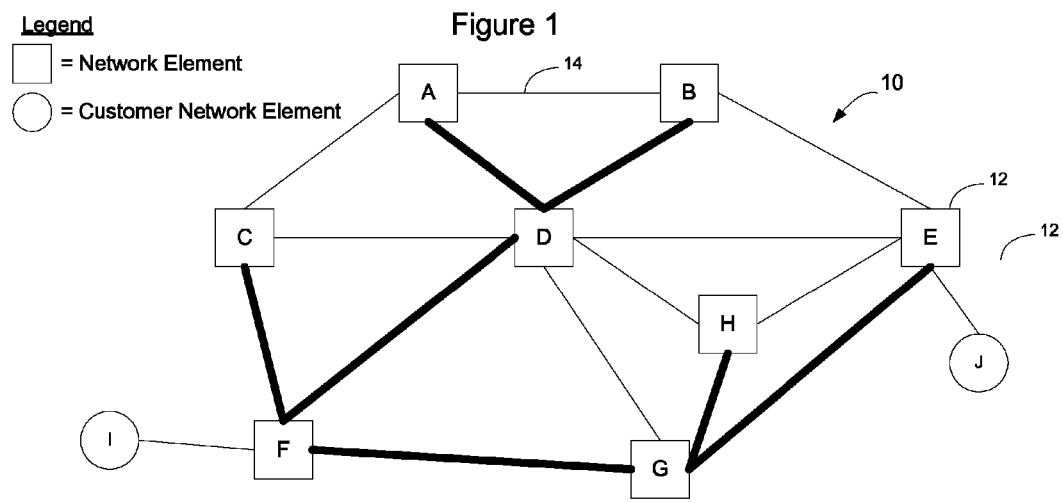
FIG. 1 is a functional block diagram of an example link state protocol controlled Ethernet network.

FIG. 1 is a functional block diagram of an example of a portion of a link state protocol controlled Ethernet network 10. As shown in FIG. 1, the network 10 in this example includes a plurality of network elements 12, interconnected by links 14. The network elements 12 exchange hello messages to learn adjacencies of other network elements, and exchange link state advertisements to enable each node to build a link state database that may be used to calculate shortest paths between ingress and egress nodes through the network. Additional details associated with an example link state protocol controlled Ethernet network are provided in U.S. patent Ser. No. 11/537,775, filed Oct. 2, 2006, entitled "Provider Link State Bridging" the content of which is hereby incorporated herein by reference.

Two examples of link state routing protocols include Open Shortest Path First (OSPF) and Intermediate System to Intermediate System (IS-IS), although other link state routing protocols may be used as well. IS-IS is described, for example, in ISO 10589, and IETF RFC 1195, the content of each of which is hereby incorporated herein by reference. Although there are current versions of this protocol, the invention is not limited to an implementation based on the current version of the standard as it may be adapted to work with future versions of the standard as they are developed. Similarly, the invention is not limited to an implementation that operates in connection with one of these particular protocols as other protocols may be used to exchange routing information as well.

In addition to installing shortest path unicast forwarding state, the nodes may also install forwarding state for multicast trees on the network. An example of a way to implement multicast in a link state protocol controlled Ethernet network is described in greater detail in U.S. patent application Ser. No. 11/702,263, filed Feb. 5, 2007, entitled "Multicast Implementation in a Link State Protocol Controlled Ethernet Network" the content of which is hereby incorporated herein by reference. As described in that application, link state advertisements may be used to advertise multicast group membership to cause forwarding state for a multicast group to be installed on the network. In particular, each source for a given multicast group may be assigned a destination MAC Address (DA) that is used to forward the frames on the network. The nodes on the network install forwarding state for the source/group tree if they happen to be on a shortest path from the multicast source to one of the destination nodes advertising via linkstate "interest" in the multicast group.

Interest in a multicast may be based on the community of interest identifier such as the I-SID, such that a node on the network will install forwarding state for a multicast group when it is on a shortest path between a source and destination that have both advertised interest in the community of interest identifier associated with the multicast group. The forwarding state, however, is based on the multicast DA and VID associated with the multicast. In operation, when an interior node receives a frame it will perform a lookup in its Forwarding Information Base (FIB) based on the destination address (DA) and VID associated with the frame, and forward the frame accordingly. As mentioned above, although an embodiment of the invention will be described in which the I-SID is used as a community of interest identifier, the invention is not limited to this embodiment as other types of community of interest identifiers may also be used.

Traffic engineering may be used to create paths that do not necessarily follow only the shortest path on a link state protocol controlled Ethernet network. Forwarding state for the traffic engineering paths may be differentiated from forwarding state that was installed in connection with implementation of the shortest path routing protocol by identifying the traffic engineering forwarding state using a different VID. One way of creating traffic engineering paths through a link state protocol controlled Ethernet network is disclosed in U.S. patent application Ser. No. 11/732,381, filed Apr. 3, 2007, entitled "Engineered Paths In A Link State Protocol Controlled Ethernet Network," the content of which is hereby incorporated herein by reference.

When a frame arrives at a network element, for example if customer network element I were to transmit a frame to customer network element J, the frame will be received at the provider network element F. Network element F will determine if it knows which of the nodes on the provider network are able to reach the customer MAC address of destination node J (C-MAC). If F has already learned that provider network element E is able to reach customer network element J, network element F will add a MAC header to perform Mac-in-Mac encapsulation of the customer frame. The outer header will include the destination MAC address of network element E to cause the frame to be forwarded on the network.

Similarly, where the frame is a multicast frame the provider network element F will determine the provider multicast DA that should be used to transmit the frame on the provider network. The ingress network element F will then transmit the frame across the provider network using shortest path forwarding or, alternatively, using any available traffic engineered path through the network. The ingress node performs C-MAC → B-MAC resolution and encapsulates the client frame using a new MAC header such that the resultant encapsulated frame is addressed using the B-MAC addressing space. MAC-in-MAC encapsulation is well known in the art and a detailed description of the processes involved in this type of encapsulation will therefore not be provided.

Where ingress node F does not know which provider node is able to reach customer node J, the ingress node will simply use the multicast tree associated with the community of interest (or I-SID) to flood the packet to all other BEBs in the community of interest. Any subsequent message from J will permit F to learn which provider DA to use for the outer MAC header. Optionally, a distributed HASH table may be used to store the C-MAC to B-MAC correlations so that the ingress node may transmit a query to one or more nodes implementing the distributed HASH table rather than broadcasting an address resolution request. One way of implementing a distributed HASH table is disclosed in U.S. patent application Ser. No. 11/714,508, filed Mar. 6, 2007, entitled "Distributed Storage of Routing Information in a Link State Protocol Controlled Ethernet Network", the content of which is hereby incorporated herein by reference.

As the network increases in size, and larger numbers of nodes are included in the network, it may be desirable to divide the network into two or more smaller areas. This allows the control plane to be separated into two or more instances, so that the routing updates may be contained within the smaller network area and changes within one area do not perturb the adjacent areas. From a routing perspective this is advantageous as the number of link state advertisements may be reduced, the size of the link state databases may be reduced, and the overall speed of convergence of the network upon change in topography may be increased. However, dividing the network into two or more network areas has a disadvantage, in that the establishment of connectivity that spans between the network areas needs to be accommodated.

Once the network passes a certain size, sub-division may not be sufficient in and of itself to solve scalability issues, and it may be necessary to reduce the amount of state in the core of the network (L2 network) in order to continue to grow the network. This can be achieved by hierarchically recursing the network (MACinMACinMAC) both at the control plane and data planes and, in the preferred embodiment, re-using MAC learning as per 802.1ah in order to establish the bindings between the B-MAC layer and the further recursed MAC layer.

A loop in the forwarding path for Ethernet can be catastrophic if the forwarding path is a multicast path. Therefore it is advantageous to use a routing hierarchy vs. mesh interconnect of peer networks as the problem of ensuring loop freeness even in the presence of routing policy is simplified. Routing systems have such a concept, an exemplar being the notion of L1/L2 in IS-IS, in which L1 areas are only reachable via the L2 area.

Figure 2:
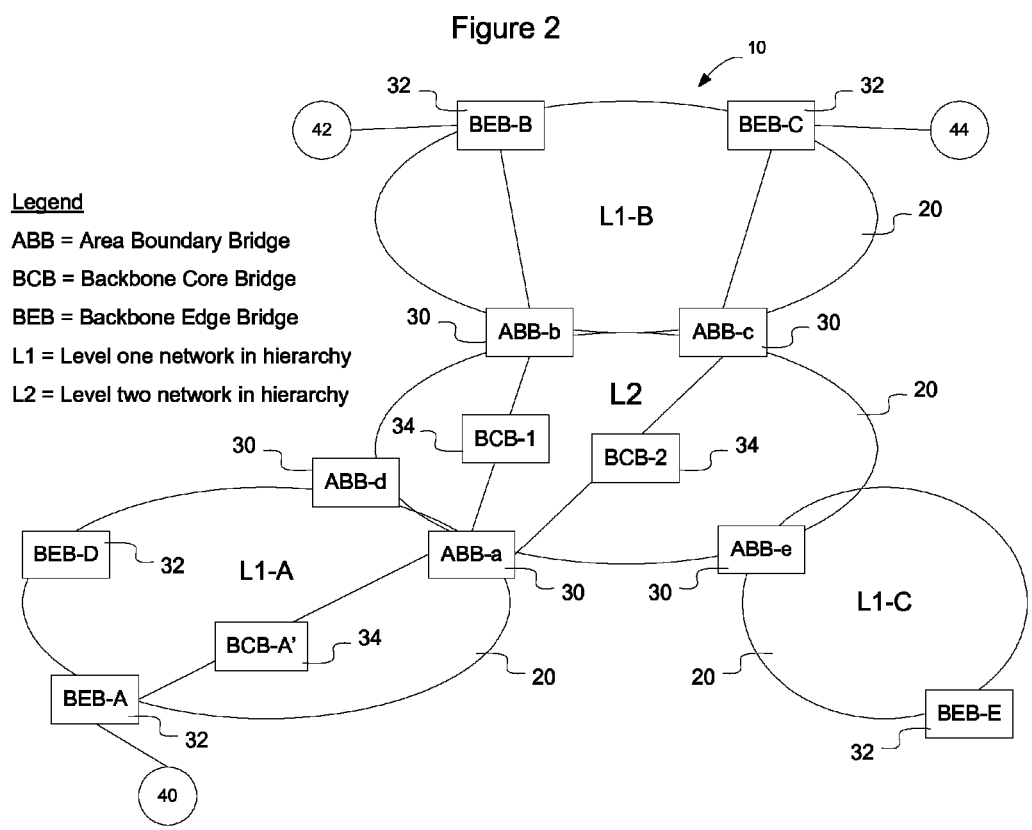
FIGS. 2 and 3 are a functional block diagrams of an example set of interconnected link state protocol controlled Ethernet network areas according to an embodiment of the invention.

FIG. 2 illustrates one example of a communication network 10 in which multiple link state protocol controlled Ethernet network areas 20 are interconnected via Area Boundary Bridges (ABB) 30. Specifically, in FIG. 2, the network 10 includes a first set of link state protocol controlled Ethernet network areas L1A, L1B, and L1C. The first set of link state protocol controlled Ethernet networks may be, for example, metropolitan area networks, although the invention is not limited to this particular example. The networks L1A, L1B, and L1C are interconnected by another link state protocol controlled Ethernet network L2. The L2 network may be, for example, a provider core network configured to interconnect the L1 networks. The invention is not limited to the particular example shown in FIG. 2, as the network of FIG. 2 is merely intended to illustrate one example environment in which the invention may be implemented. In IS-IS, the formal interface between an L1 and L2 is defined as being on a connection, not within a node. In this document an ABB is defined as a bridge operating both L1 and L2 routing instances.

Customers connect to the networks via Backbone Edge Bridges (BEBs) 32. Within the network, connectivity is established via Backbone Core Bridges (BCBs) 34. Assume, as shown in FIG. 2, that a customer 40 that connects to network L1A via BEB-A would like to be able to communicate with customer 42 that connects to network L1-B via BEB-B, and would like to be able to communicate with customer 44 that connects to network L1-B via BEB-C. To enable communication of this nature, it will be necessary to establish a route between A and B via network areas L1-A, L2, and L 1-B, and similarly to establish a route between A and C via network areas L1-A, L2, and L1-B.

There are a number of constraints to be considered in a multi-area solution. Unlike (for example) phone numbers, Ethernet MAC addresses cannot be summarized whereby a shorthand represents a group (such as 613 area code is the area code designating all phone numbers in Ottawa, Canada). Further the network areas should implement symmetrical forwarding such that traffic is able to follow the same path in both directions through the network.

It will be assumed, for purposes of this example, that areas L1-A, L2, and L1-B are all link state protocol controlled Ethernet network areas, each of which is implementing its own link state routing protocol instance. Thus, routing information is generally contained within the various network areas, and only a limited or summarized amount of routing information is exchanged between areas. However, as described in greater detail herein, ABBs may allow community of interest identifiers such as I-SIDs and some associated BEB information to be leaked between areas, so routes associated with the BEBs with I-SIDs in common may be established through more than one area. Specifically, since interest in the I-SID may be leaked across the network boundary, route segments may be established for the I-SID in each of the network areas that collectively form a multi-area route Since leaking of the I-SIDs may be done without intervention by the network management system, the inter-area routes may be established automatically by the control planes of the multiple network areas.

According to an embodiment of the invention, ABBs on the border between two networks advertise with each network area as being able to reach the other network. Thus, for example in FIG. 2, ABB-a and ABB-d each sit on the boundary between network area L1-A and L2. Accordingly, each of these ABBs would advertise the ability to reach network area L2 within network area L1-A, and would advertise the ability to reach network area L1-A within network area L2. According to one embodiment of the invention, the ABBs may advertise network area L2 as a virtual BEB in network area L1, so that the BCBs may automatically determine which ABB should handle traffic for a given set of closest BEBs by installing forwarding state for shortest paths between the closest BEBs and the virtual BEB advertised by the ABBs. In this manner the L1 network may self-select ABBs to represent sets of BEBs into the adjacent L2 network area. If all ABBs advertise the network area L2 as the same virtual BEB, then shortest paths from the BEBs in network area L1 will automatically be installed via the ABB that is closest to the virtual BEB, and hence from the set of BEBs that are closest to a particular ABB.

The ABBs self-select to represent particular BEBs in L1 by determining which ABB is closet to each BEBs in L1. Thus, for example in FIG. 2, ABB-a is closest to BEB-A. Thus, routes from A that are required to pass out of network area L1-A will be installed via the Backbone Core Bridges (BCBs), such as BCB-A', to pass through ABB-a. Similarly, routes from BEB-D will be installed via ABB-d. There are many ways to do this, but the simplest (and the one requiring no special rules in the BEBs and BCBs in L1) is that L2 is represented into L1 as a single virtual BEB connected to the ABBs with equal cost links.

There are specific rules for how ABBs leak information between areas. An ABB closest to a BEB in L1 will advertise the I-SIDs and BEB MAC addresses associated with that area into L2, this is without apriori knowledge of what I-SIDs are of multi-area interest. ABBs will only leak BEB and I-SID information collected from other L1 areas from L2 into L1 where one or more BEBs in L1 have already indicated interest in the I-SID. Therefore the nodes in L2 will have a complete map of I-SIDs and BEBs in the control plane. The nodes in L1 will have a map of only those BEBs and I-SIDs of local area interest and those that are genuinely multi area.

One can see from the above that in L2, the appropriate dataplane connectivity will be built per community of interest identifier, i.e. per I-SID, between the ABBs electing to represent the associated BEBs in L1. Similarly in L1, the ABBs representing BEBs in other L1s will have the appropriate connectivity built to include the local BEBs that are part of the same community of interest as identified by the community of interest identifier.

BEBs on the L1 network area will advertise interest in a community of interest identifier, such as an I-SIDs, via link state advertisements or using other messages in the L1 network area. In this example, it will be assumed that the community of interest identifier is an I-SID. Other community of interest identifiers may be used as well.

The ABBs receive the messages indicating that one or more BEB on the L1 network area is interested in an I-SID. The ABB will leak I-SIDs learned on the L1 network area that have been advertised by those BEBs that are closest to it, into the L2 network area. By only advertising I-SIDs advertised by the set of BEBs that are closest to it, the L2 network may learn which ABB should be used to forward traffic on the route to the BEB. The ABB will also listen for I-SIDs advertised by other ABBs on the L2 network area. Where more than one ABB respectively attached to a different L1 on the L2 network area has advertised interest in the same I-SID, the I-SID is of multi-area interest. The detection of an I-SID in more than one L1 ensures that the L2 network doesn't install forwarding state between two ABBs on the same L1 network. If a single L1 has more than one ABB, the internal topology of that L1 may cause more than one ABB to advertise the I-SID into L2, but this must be ignored in L2 unless a different L1 also advertises that I-SID. In this instance, ABBs that have advertised the I-SID in the L2 network will also advertise the I-SID back into its attached L1 network area, so that connectivity in the L1 network area may be established from the BEB to the ABB in the L1 network area. If multiple ABBs advertise an I-SID back into L1, connectivity between the ABBs themselves for that I-SID is not established in L1. In the example of FIG. 2, connectivity between ABB-b and ABB-c is not established in L1-B.

In the Example shown in FIG. 2, it will be assumed that BEB-A has advertised an interest in I-SID-x in network area L1-A, and that BEB-B and BEB-C have advertised an interest in I-SID-x in network area L1-B. ABB-a, ABB-b, ABB-c will all advertise interest in all I-SIDs into L2 that are advertised by BEBs which they represent. Thus, in this example, ABB-a will advertise MAC-BEB-A/I-SID-x, ABB-b will advertise MAC-BEB-B/I-SID-x, and ABB-C will advertise MAC-BEB-C/I-SID-x. ABB-a, ABB-b, and ABB-c will all determine that I-SID-x is of multi-area interest, by receiving the advertisements from the other ABBs on L2, and determining that the I-SID is being advertised from both L1-A and L1-B. Accordingly, ABB-a will advertise MAC-BEB-B/I-SID-x, and MAC-BEB-C/I-SID-x into network area L1-A, and ABB-b and ABB-c will advertise MAC-BEB-A/I-SID-x into network area L1-B. By causing each ABB to advertise all I-SIDs learned from its adjacent L1 network area into the L2 network area, the ABBs on the L2 may determine which I-SIDs are required to extend between L1 network areas and selectively advertise MAC/I-SID information for only those routes into their L1 network area.

An ABB will leak all I-SIDs of interest to their set of BEBs in L1 from L1 into L2, ABBs in L2 will advertise all the L1 I-SIDs between themselves BUT will only advertise I-SIDs from L2 into L1 when the same I-SID is also already being advertised by that L1. Thus, the net result is that within L1 all BEBs interested in a specific I-SID will have connectivity established by the routing system. Only if that I-SID exists in another area will the ABBs advertise interest in that I-SID into that L1 (in which case connectivity out of the area via the ABBs will be constructed). Within the L2 network area, the BCBs will install connectivity between ABBs of the different L1 areas that have advertised interest in the same I-SID, so that connectivity within the L2 network may be established. If any L1 has more than one ABB advertising an I-SID into L2, connectivity for that I-SID between those ABBs is not established in L2.

ABBs will advertise all I-SIDs and associated BEB information from L1 into L2. The I-SID information that is advertised from the L1 network area into the L2 network area will be in the form of the ABB MAC address, the I-SIDs and the BEB MAC addresses associated with the I-SID. When an ABB has received an I-SID advertisement from another ABB in L2 and has also received an advertisement from the local L1 indicating interest in the same I-SID, it will advertise the I-SID and BEB information received from L2 into L1.

The I-SID will be advertised within network L2. Similar to how single area solution works BCBs within area L2 will install forwarding state to enable shortest paths to be created between ABBs attached to different L1 areas that are advertising interest in the same I-SID. Thus, for example, assume that ABB-a, ABB-b, and ABB-c all advertise interest in I-SID=x. BCB-1 will recognize that it is on a shortest path between two ABBs that have advertised interest in a common I-SID and install forwarding state to enable frames to be forwarded from ABB-a to ABB-b and vice versa. Similarly, BCB-2 will install forwarding state to enable frames to be forwarded from ABB-a to ABB-c and vice versa.

ABB-b and ABB-c will leak the I-SID from network area L2 into network area L1-B as if it was advertised from a virtual BEB located behind ABBs b&c. BCBs within network L1-B will then install forwarding state if they are on shortest paths between a BEB that has advertised interest in an I-SID and the virtual BEB (which the ABB has advertised as also interested in the I-SID).

Note, in this regard, that by causing the ABBs to self-select which BEBs to represent in connection with routes that exit L1-B, parallel paths have been created between ABB-b and BEB-B, and ABB-c and BEB-C. However, using multiple ABBs to reach different BEBs will not cause forwarding conflicts as what is actually being created is a spanning tree to the virtual BEB that represents L2, which naturally results in routes between BEBs and ABBs being only installed from a BEB to the closest ABB. Where there are equal cost paths between a given BEB and two or more ABBs, the routing system will use a normal intra area tie breaking mechanism to determine which ABB should represent the BEB in the adjacent area.

I-SIDs are commonly associated with multicast connectivity. Specifically, a given multicast may be established on a network by causing those BEBs interested in the multicast to advertise interest in the I-SID associated with the multicast. Forwarding state will then be installed for the multicast as described in greater detail in U.S. patent application Ser. No. 11/702,263, as mentioned above. Other community of interest identifiers may be used instead of the I-SID and the invention is not limited to an implementation that uses the I-SID as the community of interest identifier. As mentioned previously, it is desirable to leak knowledge of BEBs between areas but in a mechanism that minimizes how changes in one area perturbs another. One way to do this is to simply associate the BEBs with the ABB in the peer area as if they were co-located, so that no knowledge of the topology of the peer area (in the form of actual metrics) need be shared between the areas. It has been simplified to simply associating a BEB with the closest ABB. One consequence of this is that the multicast tree for a given I-SID rooted at an ABB will be identical for all BEBs that are behind the ABB. This means that scalability can be enhanced by using a common destination multicast address for those multicast flows for a given I-SID that transit an ABB.

Since the ABBs may represent multiple multicasts for its set of closest BEBs, it may summarize the multicasts when leaking routing information into the adjacent area L2. For example, ABB-a may summarize multicast routing information mMAC(BEB, I-SID) by advertising instead mMAC (ABB, I-SID). Specifically, the ABB may substitute its own DA for the DA of the BEB for the given I-SID. This may also be repeated at the boundary between L2 and L1. So to illustrate:

Going from L1 to L2 the multicast tree in L2 rooted at a given ABB is common to all BEBs in the L1 that were closest to that ABB.

Going from L2 to L1, the multicast tree in L1 rooted at a given ABB is common to all closest ABBs in L2 each of which roots a tree that is common to all closest BEBs in the given L1.

No ABB on a given area boundary is ever a leaf on a multicast tree rooted on another ABB on that area boundary, either in L1 or L2.

From a path construction standpoint in the L1-A network, BCB-A' will determine that it is on a shortest path from BEB-A to L2 (via ABB-a). BCB-A' also will determine that BEB-A and ABB-a have an I-SID in common. Thus, BCB-A' will generate a multicast group address for BEB-A/I-SID=x. It will also install unicast addresses for remote BEBs that have advertised an interest in I-SID-X (BEB-B and BEB-C in this example), will install a unicast address for local BEB-A, and will generate a multicast address for ABB-a/I-SID=x.

In the L2 network, BCB-1 will determine that it is on the shortest path between ABB-a and ABB-b in L2 and that both have an I-SID (I-SID=x) in common. BCB-1 will generate multicast addresses for ABB-a/I-SID=x and ABB-b/I-SID=x and install unicast addresses for BEB-A and BEB-B.

Within a given L1 network, such as network L1-B, multiple ABBs may advertise interest or knowledge of a given I-SID. To enable BCBs within the network (L1-B network) to install forwarding state, the ABBs will advertise the I-SID in connection with the virtual BEB representing the L2 network. This will allow the BCBs to only install forwarding state for routes that span between areas through the closest ABB to the interested BEB. This also prevents multiple paths from being installed between a given BEB and more than one ABB, since only one shortest path from the BEB to the virtual BEB representing the L2 network will be installed, which will automatically go through the closet ABB to that BEB. BCBs may be configured to not install forwarding state between ABBs on a common network boundary (e.g. L1A-L2) even though two or more ABBs may be advertising interest in the same I-SID.

Within L2, a given ABB may have many BEBs behind it that it is representing into network area L2. To simplify the shortest path calculation on BCBs within network area L2, the BCBs will base the routing computations on the ABBs rather than on the BEBs the ABBs represent. In this instance, each BCB in L2 may determine if it is on the shortest path between two ABBs, and if so whether the ABBs have an I-SID in common. If both of these conditions exist, the BCB may then install forwarding state for the multicast MAC address mMAC(ABB, I-SID=x) and the unicast MAC addresses uMAC(BEB) for those BEBs participating in the set of I-SIDs common to the two ABBs.

By causing the ABBs to self-select, unicast forwarding may be established across multiple domains without requiring explicit paths to be set up. Rather, the routing system may implement the unicast paths and enable forwarding state to be set up for the unicast paths even where the unicast paths are required to span across multiple network areas.

Since each network area has its own control plane, topology changes may often be isolated within a given network area. However, when a topology change occurs that affects the election of ABBs for BEBs, the topology change will also affect the adjacent network. Specifically, assume that a failure has occurred on network L1-A which has caused the shortest path to L2 for BEB-A to change such that it transits ABB-d. In this instance the routing system in L1-A will cause a new shortest path to be established from BEB-A to ABB-d, and will cause ABB-d to advertise BEB-A/I-SID=x into L2. This will cause new shortest paths to be established within L2 between ABB-a and ABB-d, and between ABB-c and ABB-d. However, the network change will not affect the other L1 areas so that local failures are able to be contained without cascading routing changes throughout all areas of the network. Additionally, while some failures in network L1-A may affect the routing system in L2, many failures in network L1-A will not affect the selection of ABBs for the BEBs, thus enabling the failure to be localized within L1-A so that the routing within L2 is not affected by the failure.

Once consequence of L2 being modeled as a virtual BEB in L1 is that multiple copies of a multicast packet may enter L1 from L2. However as the overall behavior is that of a spanning tree rooted at the virtual BEB in L2, each BEB in L1 will still only receive one and only one copy of a given multicast packet.

Although an example has been provided, and described in detail in connection with a particular example network shown in FIG. 2, the invention is not limited in this manner as the techniques described herein may be used in many different network settings to construct paths across multiple areas. Thus, the invention is not limited to an implementation in a network having network areas interconnected as shown in FIG. 2 but rather may be employed in connection with any network in which two or more link state protocol controlled Ethernet network areas are interconnected by one or more ABBs. Similarly, although the I-SID was used as an example of a type of community of interest identifier that may be used to determine which communities of interest span between areas, the invention is not limited in this manner as other community of interest identifiers may be used as well.

Where a given BEB has two or more paths that are equal cost to two or more ABBs and diverge, then it may be necessary to use different VIDs to differentiate the traffic to the different ABBs. Other ways of resolving conflicts between ABBs may be used as well and the invention is not limited to an implementation that uses different VIDs to identify traffic intended to the different ABBs.

ABBs and BCBs in L2 have an additional requirement in that an ABB on a given area boundary cannot be a leaf for a multicast tree from an ABB on the same area boundary. This prevents loops from forming at area boundaries.

When traffic is forwarded from one network area into another network area, such as a L1 area into the L2 area, the traffic may be encapsulated so that forwarding over the second area occurs using that area's MAC addressing space. For example, when a frame is received by BEB-A from customer 16 that is addressed to customer 18 on BEB-B, the frame will initially have the destination address DA=C-MAC address of customer 18. BEB-A will determine which BEB is able to reach the customer MAC address and encapsulate the customer frame using a provider Ethernet header. For example, BEB-A may perform MAC-in-MAC encapsulation so that the frame may be forwarded over the L1-A network using provider MAC address space rather than customer MAC address space. There are several ways for the BEB-A to determine which BEB on the network is able to reach customer 18 and the invention is not limited to the particular way in which this information is disseminated.

After the frame is transmitted across network area L1-A, it will arrive at ABB-a where it will be transmitted onto network area L2. It will be assumed, in connection with this, that the paths have been established as described in greater detail above. According to an embodiment of the invention, ABB-a may further encapsulate the frame for transmission across the L2 network by performing MAC-in-MAC-in-MAC encapsulation so that forwarding of the frame within the L2 network may use L2 MAC address space. Specifically, ABB-a may determine which other ABB on L2 is able to forward the frame on to its destination (B-MAC address) will determine the MAC address of the destination ABB on the L2 network (A-MAC address) and will then add a L2 MAC header to further encapsulate the frame for transmission on the L2 network. This enables L1 addresses to be summarized onto L2 at the ABBs via encapsulation, so that BCBs within L2 need only install routes based on L2 MAC (A-MAC) address space.

C-MAC/B-MAC learning in the L1 network space may be populated in a normal manner. Similarly, L1-MAC/L2-MAC (B-MAC address A-MAC address) learning may be populated by the normal learning process, such as by flooding a request for a L1-MAC/L2-MAC association and waiting for a response, or by using a distributed hash table.

Figure 3:
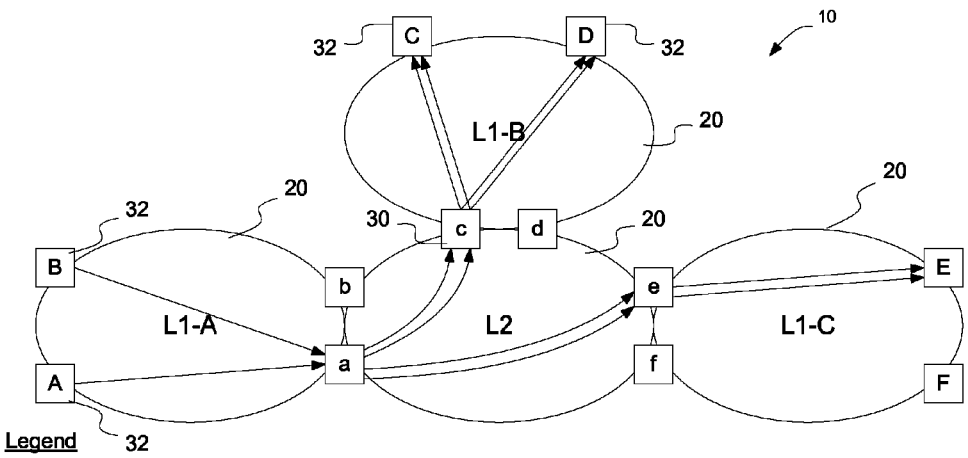

FIG. 3 illustrates visually what is happening in connection with the encapsulation process. Specifically, the L1-A metrics remain local to network area L1-A. L2 simply filters inter-L1 area routes by I-SID. This enables uMAC/mMAC congruence in L1, L2, and MAC-in-MAC-in-MAC. Multicast MAC addresses from L1-A are mapped via I-SID to a tree in L2. ABB-a needs to know that the path to BEB-E is via ABB-e. This association may be learned by flooding a request and waiting for a response. Flooding on network areas is capped at ABB boundary nodes, however, so that B-MAC/A-MAC association requests are not flooded into other areas of the network. Once the B-MAC/A-MAC association is learned by the ingress ABB, the ABB may use that address to encapsulate frames for transmission on the L2 network. Optionally, a self-assigned L2 multicast MAC address may be used where a given I-SID has been advertised by more than one destination ABB on the L2 network.

Figure 4:
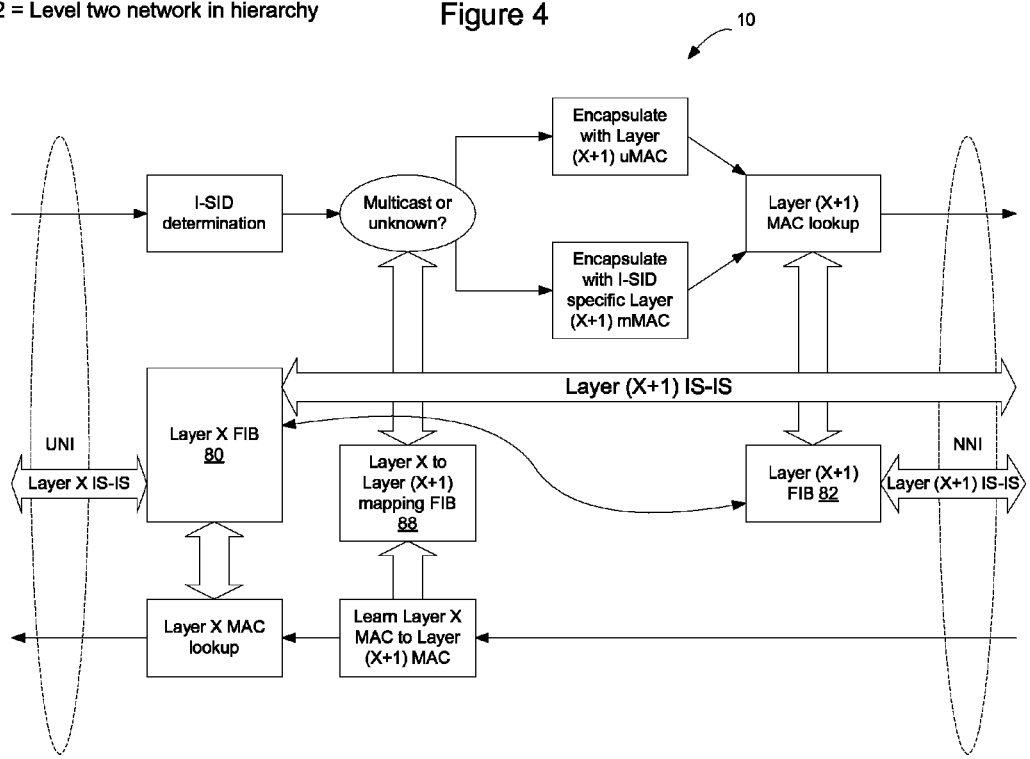
FIG. 4 is a functional block diagram decomposition of an ABB that implements both partitioning of the network into areas and hierarchical routing and which shows a process used to enable community of interest identifier information to be leaked between network areas so that paths may traverse between link state protocol controlled Ethernet network areas according to an embodiment of the invention.
Figure 6:
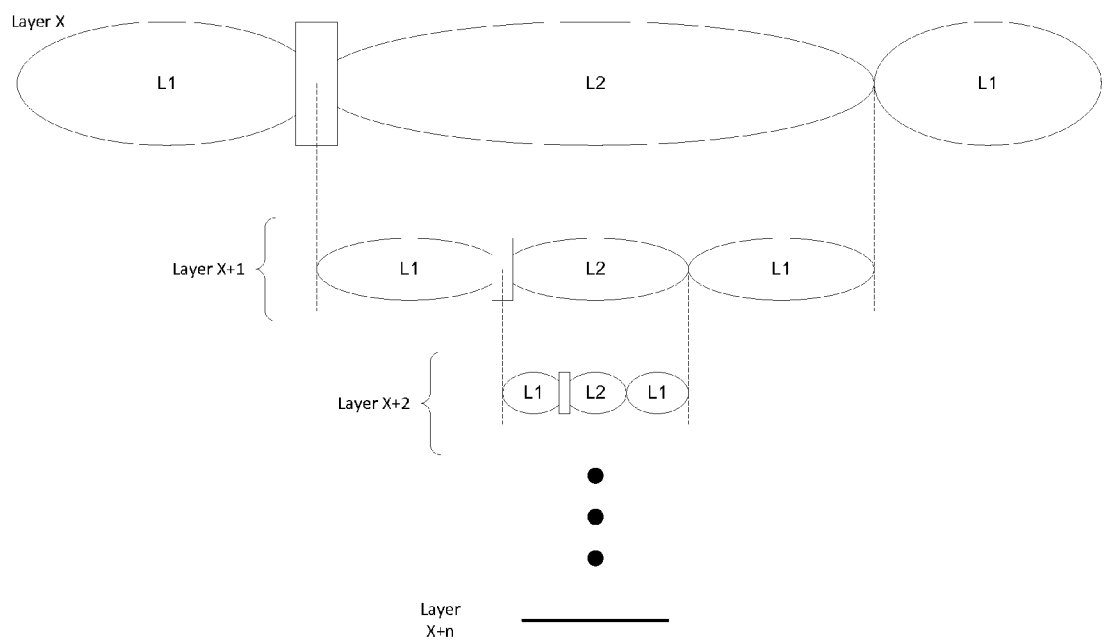
FIG. 6 is a functional block diagram of a network configured to employ recursion to enable subdivision of the network according to an embodiment of the invention.

FIG. 4 illustrates the adaptation and interlayer learning and binding functions between layers when the routing system recurses. As mentioned above, the L2 network may become too large and it may be desirable to further recurse the network to allow the L2 network to be broken up into a second level L1/L2/L1 network as shown in FIG. 6. FIG. 4 shows a process of enabling a frame to be encapsulated for transmission over a recursed L2 from L1 (where the unencapsulated layer is termed "layer X" and the encapsulated layer is referred to as "layer x+1"), and also illustrates a process of enabling a frame to be deencapsulated after receipt from the recursed network area L2 for transmission over network area L1 in a given layer.

FIG. 4 is a functional block diagram decomposition of an ABB that implements both partitioning of the network into areas and hierarchical routing. As such it communicates with peers in each partition L1 and L2 of the current layer respectively. It also peers at the recursed level, layer X+1.

The L1 FIB for layer X is populated via routing exchange with peer devices at L1 (including those communicated with across L2), similarly the L1 FIB for layer X+1 (the encapsulating layer) is populated via routing exchange with peer devices at layer X+1.

As shown in FIG. 4, when a frame is received from L1 at layer X, the ABB will look to see if the layer X destination MAC cannot be resolved to an layer X+1 MAC via lookup in the X to X+1 mapping FIB or if the frame is a broadcast or multicast frame. In these cases it will be encapsulated using the layer X+1 MAC of the BEB as the source and the multicast MAC address for the I-SID used by the BEB in layer X+1 as the destination, and forwarded according to the layer X+1 FIB. If the layer X destination MAC address can be resolved to a layer X+1 MAC address the packet is encapsulated with the BEB MAC address as the source and the layer X+1 MAC address obtained from the X to X+1 mapping FIB as the destination and forwarded according to the layer X+1 FIB.

When a packet is received from layer X+1, the source MAC is associated with the layer X source MAC and the binding inserted into the X to X+1 mapping FIB. The packet is deencapsulated and forwarded according to the information in the "layer X" FIB. It is the learning of X to X+1 bindings via creative reuse of the 802.1ah MAC learning process that obviates the need to explicitly communicate interlayer bindings in the layer X+1 routing system.

It can be noted that the network can actually use this technique to recurse an arbitrary number of times. It can also be noted that what is referred to in the example can also be sub-divided without recursion, such that a mixture of recursion, and subdivision at each layer of recursion can be employed to scale the network. This is illustrated in FIG. 6. For example, as shown in FIG. 6, the L2 network may be formed as a Layer X+1 L1/L2/L1 network having multiple L1(X+1) networks interconnected by a L2(X+1) network area. Similarly, the L2(X+1) network area may be formed as a L1/L2/L1 set of (X+2) network areas. The process described in connection with FIG. 4 may be used to implement the boundary between the L1(X) and L1/L2/L1 (X+1) layer, the boundary between the L1(X+1) and L1/L2/L1 (X+2) layer, or any further boundary between a network area and a further recursed L1/L2/L1 (X+n) layer.

From a routing standpoint, the UNI interface on the layer X network side of the ABB will store layer X I-SID information received via the layer X network link state routing protocol in the layer X FIB. Similarly, the NNI interface on the layer (X+1) network side of the ABB will store layer X+1 I-SID information received via the layer X+1 network link state routing protocol in the layer X+1 FIB. However, according to an embodiment of the invention, I-SID information is leaked between the layer X and layer X+1 networks to enable the layer X+1 network to selectively install routes through the layer X+1 network for I-SIDs that are common to different areas of the layer X network.

From a control plane perspective, the control plane information is summarized/aggregated across the layer X+1 network, to reduce the amount of information that must be handled on the control plane and installed in layer X+1 forwarding tables. This is advantageous from a scaling perspective, since the BCBs on the layer X+1 network are only require to store forwarding information for Layer X+1 MAC addresses.

The both layer X exchange and layer X+1 exchange communicates I-SID membership of peer devices, which enables other ABBs to know which I-SIDs should be leaked. The I-SID information is then used to construct multicast connectivity in the layer X+1 network area and to learn interlayer bindings. Where the layer X network uses Mac-in-Mac encapsulation, and the layer X+1 network uses Mac-in-Mac-in-Mac encapsulation, the I-SID information is used to enable the ABB to learn the Mac-in-Mac /Mac-in-Mac-in-Mac bindings so that the ABBs are able to encapsulate traffic on a per-I-SID basis.

Where alternate ABBs are to be used to interconnect the L1/L2 networks, the alternate ABB may be provided with a large metric so that it is not likely to be chosen as providing the shortest path for any BEB on the L1 network area. However, the alternate ABB may still leak I-SID information into the L1 network area, and vice-versa, to enable the network elements to have information about the ABB to enable faster convergence in the event of a failure on the primary ABB.

When an ABB fails, all traffic for an I-SID needs to be reconstructed. The traffic for the I-SID will need to be associated with a different ABB, which will require BCBs within the L1 network to install new forwarding state. One way in which this may be accomplished is to cause the new forwarding state to be installed using a different VID so that two sets of connectivity may be installed—a first set of paths for the primary ABB and a second set of paths for the secondary ABB. The forwarding state may be installed upon determination of a failure or, alternatively, may be pre-computed and installed before the failure occurs. Installing the backup forwarding state using a different VID enables the different forwarding state to be installed on the network ahead-of-time so that, upon failure of an ABB, the traffic may be automatically switched over to the alternate paths by causing the traffic to be tagged using the alternate VID.

Figure 5:
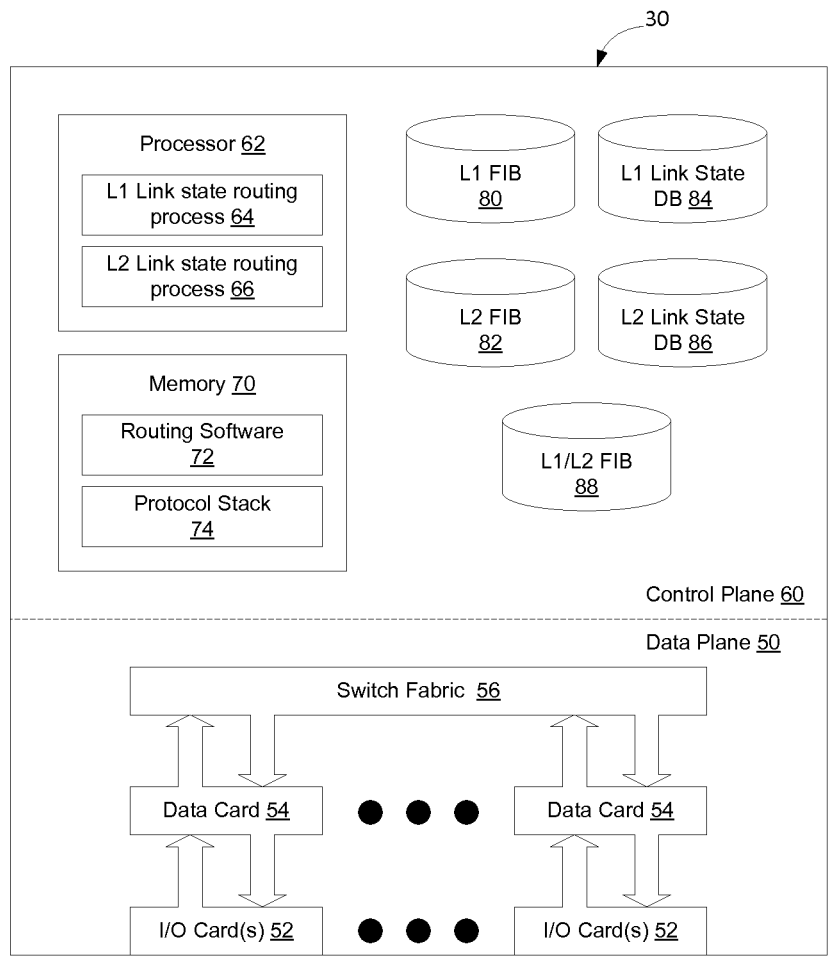
FIG. 5 is a functional block diagram of network element that may be used as an Area Boundary Bridge (ABB) at a boundary between two link state protocol controlled Ethernet network areas according to an embodiment of the invention.

FIG. 5 illustrates an example of a network element that may be used to implement an embodiment of the invention. As shown in FIG. 5, the network element includes a data plane 50 and a control plane 60. The data plane 50 generally includes Input/Output cards configured to interface with links on the network, data cards 54 configured to perform functions on data received over the I/O cards 52, and a switch fabric 56 configured to switch data between the data cards/I/O cards. The control plane contains a processor 62 containing control logic configured to implement a L1 link state routing process 64 and a L2 link state routing process 66. Other processes may be implemented in the control logic as well.

Data and instructions associated with the L1 link state routing process 64 and a L2 link state routing process 66 may be stored as L1 routing software 72 and L2 routing software 74 in memory 70. One or more databases or tables may be maintained by the ABB 30 as well to enable the ABB to store information associated with the routes that have been installed on the L1 and L2 networks. For example, the ABB 30 may include a L1 FIB 80, a L2 FIB 82, a L1 link state database 84, a L2 link state database 86, and a L1/L2 FIB 88 containing community of interest identifier (e.g., I-SID) associations between the forwarding information in the two networks. The ABB may contain other software, processes, and stores of information to enable it to perform the functions described above and to perform other functions commonly implemented in a network element on a communication network.

The functions described above may be implemented as a set of program instructions that are stored in a computer readable memory and executed on one or more processors on a computer platform associated with a network element.

However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It is possible to envision variations of U.S. patent application Ser. No. 11/537,775, filed Oct. 2, 2006, entitled "Provider Link State Bridging," with respect to how both the source and multicast group of interest are encoded in the dataplane which can be accommodated by the basic techniques for shortest path tree construction described above, but with small modifications to the dataplane transfer function performed at ABBs.

In one variation, the multicast group address for a given group of interest is common to the entire group of BEBs that support the group of interest and the specific source BEB or ABB (multicast source) is encoded in the VLAN field. In this case, summarization of multicast MAC addresses is not possible, but summarization of VLAN information is possible between areas. This is useful as such a technique is not frugal of VLANs and therefore a multi-area solution can dramatically increase the scalability of the network. Summarization can be performed by well understood VLAN translation at the ABB egress, whereby the ABB overwrites the VLAN of a multicast packet with a VLAN value that has been assigned to the ABB as a multicast source. The invention is not limited by the particular way in which VLAN values are assigned to the ABBs as multicast sources.

In this variation, the shortest path tree from a given BEB would have a unique VLAN wrapper per tree, so the shortest path tree from BEB A would see (for example) all packets from BEB A tagged with VLAN 1, all packets from BEB B tagged with VLAN 2 etc. Reverse path forwarding check (RFPC) would then be performed on the VLAN instead of the source MAC address. Packets that are required to transit between areas would flow through an ABB and onto a shortest path tree in an adjacent area. Packets flowing on the shortest path tree from an ABB would simply be re-tagged with the VID assigned to the ABB as a multicast source, so that the ABB becomes the "choke point" for the set of multicast sources that transit areas via that ABB. Thus, given that there are 4000 odd VLAN tags available, the net result is that each "area" or "level" could have 4000 nodes (sum of BEBs, BCBs, and ABBs), while summarization by the ABB (and replacement of the VID by the ABB) thus permits each area to have its own VID space and the network can grow in size by multiples of 4000 nodes per area.

In another variation, the multicast group address is common as described above, but the source is only encoded in the source MAC address, and the VLAN used is common to all BEBs. In this case, no summarization of multicast addressing is possible at an ABB and the packets would be passed unmodified.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of installing connectivity across first and second network areas interconnected by at least a first Area Boundary Bridge (ABB), the first network area being a link state protocol controlled Ethernet network comprising a first plurality of network elements implementing a first control plane, the first plurality of network elements comprising a first set of Backbone Edge Bridges (BEBs), the method comprising:

receiving, at the first ABB from a first set of BEBs, first community of interest identifiers;

leaking the first community of interest identifiers by the first ABB from the first network area into the second network area;

listening, by the first ABB, for second community of interest identifiers leaked by other ABBs into the second network area;

comparing the first community of interest identifiers to the second community of interest identifiers to identify matching community of interest identifiers in the first and second network areas, the matching community of interest identifiers including community of interest identifiers that are common to the first and second network areas; and advertising, by the first ABB into the first network area, the matching community of interest identifiers.

2. The method of claim 1, wherein the community of interest identifiers are Ethernet I-component service identifiers (I-SIDs).

3. The method of claim 2, wherein leaking the first community of interest identifiers by the first ABB from the first network area into the second network area comprises transmitting a link state advertisement containing a destination media access control (MAC) address and the community of interest identifiers into the second network area.

4. The method of claim 3, wherein the destination MAC address is a MAC address of one of the BEBs in the first network area.

5. The method of claim 3, wherein the destination MAC address is a MAC address of the first ABB.

6. The method of claim 1, further comprising representing, by the first ABB into the second network area, a subset of the BEBs in the first network area, wherein leaking the first community of interest identifiers by the first ABB from the first network area into the second network area comprises leaking only community of interest identifiers received from the subset of BEBs represented by the first ABB.

7. The method of claim 1, wherein the first set of BEBs are associated with the first network area, and the first community of interest identifiers are received at the first ABB from the first network area.

8. A method of installing connectivity across first and second network areas interconnected by at least a first Area Boundary Bridge (ABB), the first network area being a link state protocol controlled Ethernet network comprising a first plurality of network elements implementing a first control plane, the first plurality of network elements comprising a first set of Backbone Edge Bridges (BEBs), the method comprising:

receiving, at the first ABB from a first set of BEBs, first community of interest identifiers;

representing, by the first ABB into the second network area, a subset of the BEBs in the first network area;

leaking, by the first ABB from the first network area into the second network area, only first community of interest identifiers received from the subset of BEBs represented by the first ABB;

listening, by the first ABB, for second community of interest identifiers leaked by other ABBs into the second network area;

comparing the first community of interest identifiers to the second community of interest identifiers and identifying matching community of interest identifiers in the first and second network areas, the matching community of interest identifiers including community of interest identifiers that are common to the first and second network areas; and advertising, by the first ABB into the first network area, the matching community of interest identifiers.

9. The method of claim 8, wherein the community of interest identifiers are Ethernet I-component service identifiers (I-SIDs).

10. The method of claim 9, wherein leaking the first community of interest identifiers by the first ABB from the first network area into the second network area comprises transmitting a link state advertisement containing a destination media access control (MAC) address and the community of interest identifiers into the second network area.

11. The method of claim 10, wherein the destination MAC address is a MAC address of one of the BEBs in the first network area.

12. The method of claim 10, wherein the destination MAC address is a MAC address of the first ABB.

13. The method of claim 8, wherein the first set of BEBs are associated with the first network area, and the first community of interest identifiers are received at the first ABB from the first network area.

14. A method of installing connectivity across first and second network areas interconnected by at least a first Area Boundary Bridge (ABB), the first network area being a link state protocol controlled Ethernet network comprising a first plurality of network elements implementing a first control plane, the first plurality of network elements comprising a first set of Backbone Edge Bridges (BEBs), the method comprising:

receiving, at the first ABB from the first set of BEBs, first community of interest identifiers;

leaking the first community of interest identifiers by the first ABB from the first network area into the second network area;

listening, by the first ABB, for second community of interest identifiers leaked by other ABBs into the second network area;

comparing the first community of interest identifiers to the second community of interest identifiers and identifying matching community of interest identifiers in the first and second network areas, the matching community of interest identifiers including community of interest identifiers that are common to the first and second network areas; and advertising, by the first ABB into the first network area, the matching community of interest identifiers.

15. The method of claim 14, wherein the community of interest identifiers are Ethernet I-component service identifiers (I-SIDs).

16. The method of claim 15, wherein leaking the first community of interest identifiers by the first ABB from the first network area into the second network area comprises transmitting a link state advertisement containing a destination media access control (MAC) address and the community of interest identifiers into the second network area.

17. The method of claim 16, wherein the destination MAC address is a MAC address of one of the BEBs in the first network area.

18. The method of claim 16, wherein the destination MAC address is a MAC address of the first ABB.

19. The method of claim 14, further comprising representing, by the first ABB into the second network area, a subset of the BEBs in the first network area, wherein leaking the first community of interest identifiers by the first ABB from the first network area into the second network area comprises leaking only community of interest identifiers received from the subset of BEBs represented by the first ABB.

20. The method of claim 14, wherein the first set of BEBs are associated with the first network area, and the first community of interest identifiers are received at the first ABB from the first network area.

* * * * *